Dec. 20, 1966    G. W. MYLER    3,292,528
BROILER GRID AND PAN
Filed Jan. 13, 1965

INVENTOR.
GEORGE W. MYLER
BY
ATTORNEY.

United States Patent Office 3,292,528
Patented Dec. 20, 1966

3,292,528
BROILER GRID AND PAN
George W. Myler, Emmaus, Pa., assignor to Caloric Corporation, Topton, Pa., a corporation of Pennsylvania
Filed Jan. 13, 1965, Ser. No. 425,235
2 Claims. (Cl. 99—446)

This invention relates to a broiler grid and pan of the type shown, for example, in Klein Patent No. 2,459,657 and in McCormick Patent No. 2,214,060.

One object of the invention is to provide an improved broiler grid and pan of the type set forth.

In the prior structures of which I am aware, the grid rested on a seat formed inwardly of the rim of the pan, as in the Klein patent, or it was carried by a wire frame, or other support, which rested on the bottom of the pan as in the McCormick patent.

In either case, at least the rim of the pan was exposed to the direct action of the heater thereabove, and it frequently became heated enough to carbonize, or bake-one, the juices dripping from the food being broiled.

It is therefore a further object of the invention to produce an improved construction wherein the body of the pan, and the rim thereof, are completely covered by the grid so as to prevent the formation of the hard-to-remove encrustations which otherwise form on the rim and other exposed surfaces of the pan.

In order to insure adequate drainage, the grid has heretofore been provided with relatively large slots, or other openings, located over the entire surface of the grid. This permitted excessive heat energy to reach the bottom of pan where it dried up the meat juices and frequently ignited the fat in the pan.

It is therefore a still further object of the invention to produce an improved broiler grid which shields the pan from excessive heat without adversely affecting its drainage capacity.

During relatively recent times, flameless infrared ray generators have been substituted for the electric heaters and inverted gas burners previously used.

It is therefore a still further object of the invention to produce an improved grid which is especially advantageous for use in broiling equipment utilizing infrared generators, in place of electric heaters or the flames of inverted gas burners.

A still further object is to provide an improved grid which has no sharp edges and is easy to clean.

The full nature of the invention will be understood from the following description and the accompanying drawings in which.

In the accompanying drawings, A designates a grid, and B designates the pan.

Grid A is generally rectangular in shape and may be drawn, or otherwise fabricated from a metal or alloy having the necessary rigidity and lightness. Cold rolled steel of about 20 or 22 gauge will do, and care should be taken in fabrication to assure the production of a smooth surface free from sharp corners or crevices. The completed grid is nickel-chrome plated or otherwise treated to produce a bright surface, having maximum infrared ray reflecting capacity.

The pan B is also generally rectangular in shape and has dimensions slightly less than the overall measurements of the grid, thereby permitting the grid completely to cover the pan and the rim thereof. The pan may be formed of any suitable metal of any suitable gauge, and may be enamelled in the well-known manner. Since the pan is completely shielded from the source of infrared rays, it need not have an infrared ray or other heat reflecting surface.

Figure 1:
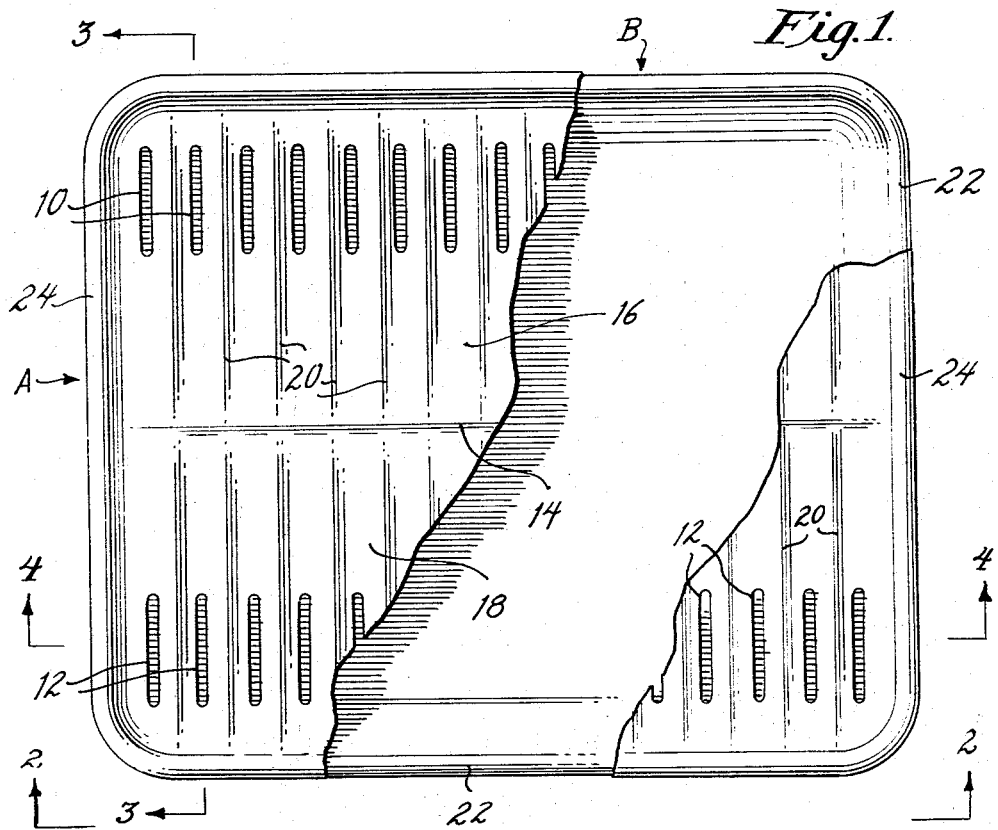
FIG. 1 is a top plan view of the invention with the grid partly broken away to expose the pan.
Figure 3:
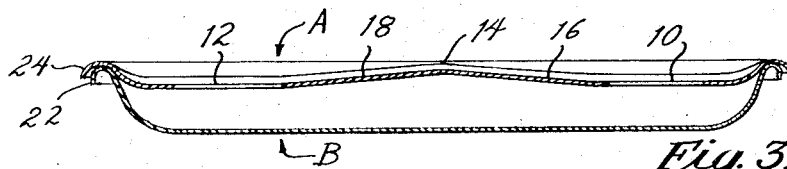
FIG. 3 is a sectional view looking in the direction of line 3—3 on FIG. 1.
Figure 4:
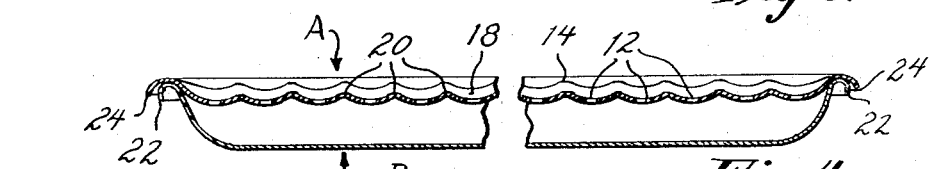
FIG. 4 is a sectional view looking in the direction of line 4—4 on FIG. 1.

As stated, a conventional grid is provided with relatively large slots located over its entire area. But, in order to minimize the transfer of heat to the bottom of the tray, I provide my grid with two groups of transverse, relatively small slots 10 and 12 which are limited to the marginal portions of the grid, FIG. 1, and, in order to insure adequate drainage, I provide the grid with a central longitudinal ridge 14, whereby the body of the ridge slopes as at 16 and 18 or toward the respective groups of slots, FIGS. 1 and 3. This accelerates the flow of grease toward the slots and, in order further to improve the drainage, I provide transverse ridges 20 which extend over the entire surface of the grid and are parallel to the slots, FIGS. 1 and 4. Transverse ridges 20 form narrow valleys 21 which confine the juices running down slopes 16 and 18 so as to give the liquids referred to, a depth, or head, which accelerates the passage of the liquids through the slots as distinguished from a less inclined surface over which the liquids tend to move sluggishly.

Figure 2:
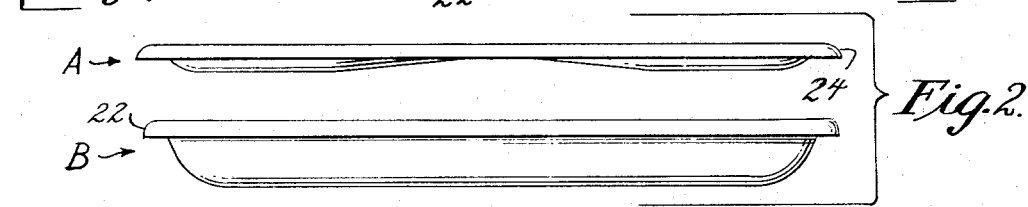
FIG. 2 is an exploded, side elevational view looking in the direction of line 2—2 on FIG. 1.
Figure 5:
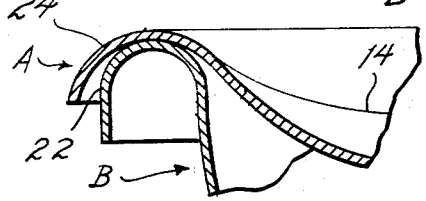
FIG. 5 is an enlargement showing the relation of the rim of the grid to the rim of the pan.

Pan B is provided with the conventional beaded rim 22 which, in the conventional structures referred to, is exposed, and becomes encrusted with charred, baked-on grease. In order completely to cover the pan, the grid of my invention is made co-extensive with the pan and is provided with a turned down lip 24 which is adapted to overlie and wholly to conceal the rim of the pan, FIGS. 1 and 2. But, in order to facilitate the grasping and removal of the grid, its lip 24 is so shaped as to extend outwardly of rim 22, as best shown in FIG. 5.

A grid embodying the invention provides for adequate drainage and by shielding the high, otherwise exposed rim, it prevents encrustation of the rim. Also, by shielding the major part of the bottom of the pan, it prevents heating to the degree at which the greases become charred or ignited. This is true in any case but the effectiveness of the grid of my invention is much increased when it is provided with a bright infrared ray reflecting surface. In fact, due to this reflection of rays and due to the much shorter infrared ray cooking time, the pan does not normally get hot enough to solidify the drippings which in actual trials, could be readily poured out without leaving any residue, which cannot be easily wiped off with a paper towel or napkin.

What I claim is:
1. In combination:
   a pan having a bottom and side walls,
   a grid coextensive with and adapted to overlie said pan,
   said grid having two groups of transversely extending slots, one group near each of two opposite edges thereof,
   said slots being disposed with their longitudinal axes substantially normal to said edges,
   the remaining surface of said grid being imperforate and being dihedral in a cross section taken on a plane parallel to said longitudinal axes whereby the body of said grid comprises two, oppositely sloping, portions, one portion sloping toward one group of slots and the other portion sloping toward the other group of slots, and raised ridges between and parallel to each pair of adjacent slots, and providing oppositely sloping surfaces leading to the slot therebetween.

2. In a broiler grid and pan assembly, the combination of:
a pan comprising a solid bottom and upwardly turned, integrally formed sides,
said sides terminating upwardly in a continuous peripheral rim,
said rim being parallel to and spaced from the pan bottom defining an interior receptacle space,
a grid registered over said pan,
said grid being pierced by a plurality of spaced, transverse, slotted openings,
said openings being formed in valleys disposed transversely on each side of the longitudinal axis of the grid,
said grid terminating outwardly in a continuous, peripheral rim,
said rim arcing downwardly to provide a pan-engaging lip, and,
said grid rim lip contacting the pan rim in continuous, shielding, peripheral engagement, and
flow means pressed in the said grid to direct the passage of grease drippings to the said slotted openings, said flow means including a longitudinal peaked ridge formed in the grid and coinciding with the said longitudinal axis thereof, the said ridge rising to a height above the slotted openings, causing transverse flow from the said ridge; and a plurality of transverse ridges symmetrically spaced on each side of the longitudinal axis, the said ridges rising above the said openings and each of the said openings being spaced between a pair of transverse ridges whereby the flow of grease drippings is directed towards the said openings.

References Cited by the Examiner

UNITED STATES PATENTS

| 1,783,183 | 12/1930 | Dibble | 99—425 |
| 1,954,080 | 4/1934 | Kahn | 99—425 |
| 1,956,387 | 4/1934 | Hartman | 99—446 |
| 2,411,993 | 12/1946 | Hobson | 99—425 |

FOREIGN PATENTS 615,022  12/1948  Great Britain.

BILLY J. WILHITE, *Primary Examiner.*